United States Patent
Karri et al.

(10) Patent No.: US 12,158,833 B2
(45) Date of Patent: Dec. 3, 2024

(54) CLOUD SERVICE PROVIDER SELECTION BASED ON DIGITAL TWIN SIMULATION

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Akash U. Dhoot, Pune (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 17/357,298

(22) Filed: Jun. 24, 2021

(65) Prior Publication Data
US 2022/0413989 A1 Dec. 29, 2022

(51) Int. Cl.
*G06F 11/34* (2006.01)
*G06F 9/50* (2006.01)
*G06F 11/30* (2006.01)
*G06N 5/022* (2023.01)

(52) U.S. Cl.
CPC ........ *G06F 11/3457* (2013.01); *G06F 9/5072* (2013.01); *G06F 11/3006* (2013.01); *G06N 5/022* (2013.01); *G06F 2209/5019* (2013.01); *G06F 2209/505* (2013.01)

(58) Field of Classification Search
CPC .............. G06F 11/3457; G06F 9/5072; G06F 11/3006; G06F 2209/5019; G06F 2209/505; G06N 5/022
See application file for complete search history.

(56) References Cited

U.S. PATENT DOCUMENTS

| | | | |
|---|---|---|---|
| 11,153,084 B1* | 10/2021 | Hwang | G06F 21/6218 |
| 2016/0019636 A1 | 1/2016 | Adapalli | |
| 2019/0138333 A1* | 5/2019 | Deutsch | G06Q 10/0631 |
| 2020/0257567 A1 | 8/2020 | Fontanari | |

OTHER PUBLICATIONS

Li L, Hang J, Sun H, Wang L. A conjunctive multiple-criteria decision-making approach for cloud service supplier selection of manufacturing enterprise. Advances in Mechanical Engineering. Mar. 2017;9(3):1687814016686264. (Year: 2017).*

Anonymous. "8 criteria to ensure you select the right cloud service provider." Printed Apr. 26, 2021. 13 pages. Published by Cloud Industry Forum. https://www.cloudindustryforum.org/content/8-criteria-ensure-you-select-right-cloud-service-provider.

(Continued)

*Primary Examiner* — Chuen-Meei Gan
(74) *Attorney, Agent, or Firm* — Andre Adkins

(57) ABSTRACT

A processor may automatically select a cloud service provider. A processor may receive one or more parameters associated with an entity and a cloud service dataset associated with a provider. A processor may generate a digital twin of the entity using the one or more parameters. A processor may simulate the digital twin of the entity and the cloud service dataset. A processor may identify, responsive to simulating the digital twin of the entity and the cloud service dataset, one or more predicted conditions of cloud service dataset on the entity. A processor may select the provider based, at least in part, on the one or more predicted conditions.

20 Claims, 5 Drawing Sheets

(56) References Cited

OTHER PUBLICATIONS

Anonymous. "How do I choose a cloud service provider?" Printed Apr. 26, 2021. 5 pages. Published by Microsoft Azure. https://azure.microsoft.com/en-in/overview/choosing-a-cloud-service-provider/.

Gui, et al., "A Service Brokering and Recommendation Mechanism for Better Selecting Cloud Services." Published Aug. 29, 2014. 20 pages. Published by PLOS One. https://journals.plos.org/plosone/article?id=10.1371/journal.pone.0105297.

McDonough, "7 Factors to Help You Choose the Right Cloud Service Provider." Published Aug. 31, 2017. 4 pages. Published by ThreatStack. https://www.threatstack.com/blog/7-factors-to-help-you-choose-the-right-cloud-service-provider.

Mell, et al., "The NIST Definition of Cloud Computing," Recommendations of the National Institute of Standards and Technology, U.S. Department of Commerce, Special Publication 800-145, Sep. 2011, 7 pgs.

Ramachandran, et al., "Towards Validating Cloud Service Providers Using Business Process Modelling and Simulation." Accessed Apr. 26, 2021. 18 pages. Published by School of Computing, Creative Technologies and Engineering, Leeds Beckett University, Leeds, UK. https://eprints.soton.ac.uk/390478/1/cloud_security_bpmn1%2520paper%2520_accepted.pdf.

* cited by examiner

CLOUD SERVICE PROVIDER SELECTION BASED ON DIGITAL TWIN SIMULATION

BACKGROUND

The present disclosure relates generally to the field of cloud services, and more particularly towards automatically selecting a cloud service provider.

As cloud services have evolved, so too has the external use of various systems by businesses. Businesses or organizations that want to adapt to a new business model and use a cloud service, face an uphill battle of searching through a vast market of available cloud services and deciding what cloud service provider best fits their business or organization model.

SUMMARY

Embodiments of the present disclosure include a method, computer program product, and system for selecting cloud service providers. A processor may receive one or more parameters associated with an entity and a cloud service dataset associated with a provider. A processor may generate a digital twin of the entity using the one or more parameters. A processor may simulate the digital twin of the entity and the cloud service dataset. A processor may identify, responsive to simulating the digital twin of the entity and the cloud service dataset, one or more predicted conditions of cloud service dataset on the entity. A processor may select the provider based, at least in part, on the one or more predicted conditions.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
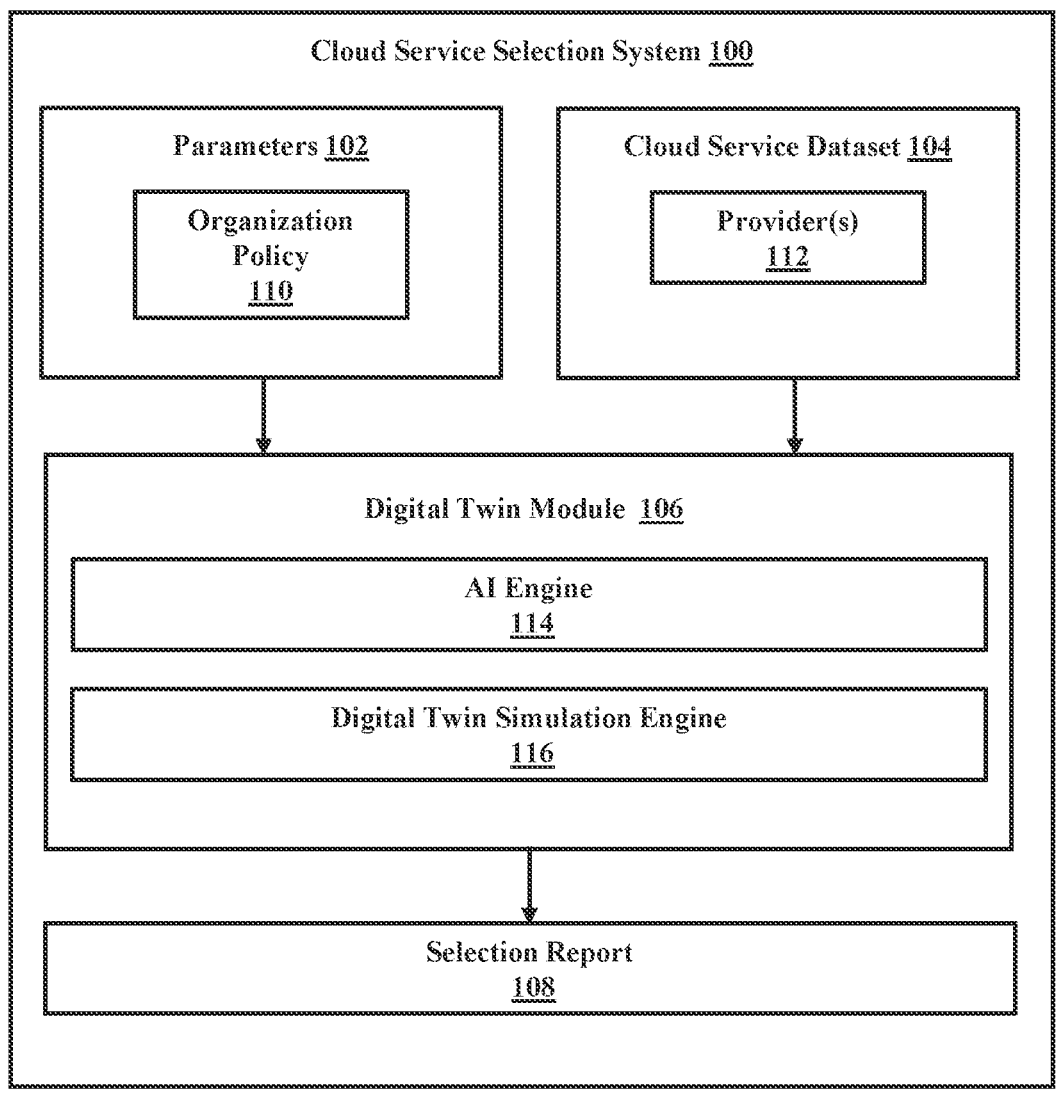
FIG. 1 illustrates a block diagram of a cloud service selection system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present disclosure relates generally to the field of providing cloud services, and more particularly towards selecting a cloud service provider. While the present disclosure is not necessarily limited to such applications, various aspects of the disclosure may be appreciated through a discussion of several examples using this context.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

More and more businesses and organizations are transferring from traditional computer systems to cloud computing. As such, the number of cloud computing service providers has risen significantly in recent years. The vast number of cloud service providers available as well as the copious number of different services each cloud service provider offers can make it difficult for an entity to decide which cloud service provider offers the optimum service for their particular business needs. Often, choosing the cloud service provider that meets a business's needs can be critical to the business's long-term success. As such, many entities struggle to select a cloud service provider that will optimally meet the entity's needs among the cornucopia of cloud service provider and the numerous options each cloud service provider offers. Accordingly, there is a desire for techniques associated with aiding entities in their selection of cloud computing service providers and/or their respective cloud computing services.

In embodiments discussed herein, solutions are provided in the form of a method, system, and computer program product, for selecting a cloud service provider. More particularly, embodiments provided herein provide techniques for a particular business (e.g., entity), having particular needs to select the optimum cloud service provider. Embodiments contemplated herein leverage the use of artificial intelligence (AI) enabled digital twin technology to improve a(n) entity's/entity's selection of a cloud service provider that meets the business's needs (e.g., sufficiently or optimally). A entity may include any business or organization configuration that may be deciding between selecting one or more cloud service providers (e.g., Microsoft®, Amazon®, Google®, etc.) to provide cloud services for the entity. While embodiments contemplated herein may use example embodiments referring to the entity as switching from traditional "on premise software" computing to cloud computing, other example embodiments, such as the entity switching from an initial cloud service (e.g., outdated cloud service) to a second cloud service (e.g., a cloud service that more appropriately meets their computing needs), may be used interchangeably.

In embodiments, a processor may be configured collect and/or receive a cloud service dataset associated with each of the considered cloud service providers. In embodiments, each cloud service dataset may include data associated with the particular cloud services each cloud service provider offers. In some embodiments, a cloud service dataset may include all of the data necessary to generate a digital twin simulation. Each cloud service dataset may include, but is not limited to, various cloud service security measures, cloud service's compliance standards (e.g., HIPAA, GDPR, etc.), offered service level (e.g., service level agreements (SLA)), level of support (e.g., support availability, response time, and capacity of support offered by provider), performance reporting, cloud service deployment (e.g., hybrid cloud, private cloud, public cloud, or community cloud), cloud service management, checks and success metrics (e.g., VPC to IP address Ping metrics), the transfer/handling of "on premises" software to the cloud infrastructure, cloud capacity, data transfer capability (e.g., of VPN per cloud per software), the hardware components that may be required/used to implement the particular cloud service, the various costs associated with the particular cloud service provider, or any combination thereof. In some embodiments, each cloud service dataset may include differentiating factors about each of the different cloud services offered their respective cloud service provider.

While in some embodiments a processor may receive each cloud service dataset as a data package, in other embodiments, a processor may analyze various sources of information associated with the cloud service provider to compile the cloud service dataset. These sources may include technical manuals, reports provided by the cloud service provider, or any other source of information that may have data/information associated with the particular cloud services of the particular cloud service provider. In embodiments, a processor may use an AI engine (e.g., configured within cloud service selection system) to compile information/data, such as the information/data contemplated herein, the cloud service dataset and to derive granular level detail of each cloud service provider that may be utilized to generate the digital twin simulation of the cloud service provider and their respective cloud services.

In some embodiments, a cloud service dataset may also include feedback associated with each cloud service provider. In embodiments, a processor may collect the feedback from one or more other entities that have previously used a particular cloud service offered by the cloud service provider. In other embodiments, after an entity has selected the cloud service provider, a processor may utilize machine learning to compile feedback.

In embodiments, a processor may receive, one or more (business) parameters associated with an entity (e.g., business, organization, company, etc.) and a dataset associated with a provider (e.g., cloud service provider, etc.). One or more parameters may include, is but is not limited to, different types of business data, the number and/or types of business assets, business dimensions, or any combination thereof (e.g., a plurality of data associated with the entity). In embodiments, a processor may organize the different types of business data and the number and/or types of business assets into one or more classifications, to form classified entity data. These one or more classifications of the classified entity data may be utilized during the digital twin simulation to simulate how the entity's business data may function within different cloud service environments. For example, depending on the entity's classified entity data the cloud service selection system may determine what cloud deployment type may best suit the entity's data needs (e.g., multi-cloud, private cloud, hybrid cloud, etc.). While in some embodiments, a processor classifies the classified entity data using an AI engine, in other embodiments the information may be classified during the digital twin simulation.

In some embodiments, one or more parameters may also include an organization policy. An organization policy may include one or more constraints associated with the entity's preferences. While some providers may offer cloud services that address the constrains associated with the organization policy, other providers may not be capable of delivering such cloud services. Accordingly, an organization policy may act as a basis of selection criteria to ensure the selected provider can address the entity's cloud computing needs.

In embodiments, an organization policy may include one or more consumer requirement rules, service mapping requirement rules, and asset classification rules. In these embodiments, consumer requirement rules, service mapping requirement rules, and asset classification rules may apply constraints that may be considered during digital twin simulation. The inclusion of consumer requirement rules may be dependent on the type of industry the entity operates within. For example, some entities may provide consumer services and may be required to maintain/store large amounts of data associated with each consumer. As such, in embodiments, for various reasons (e.g., administrative, regulatory, etc.), there may be additional constraints on the entity's cloud service selection associated with consumers and consumer needs.

While in some embodiments, a processor may be configured to receive the consumer requirement rule from the entity, in other embodiments, a processor may be configured to receive/collect business service consumer base data. In these embodiments, a processor may be configured to use an AI engine (e.g., configured within cloud service selection system) to analyze the business service consumer base data. In these embodiments, the processor may identify one or more consumer requirement rules (e.g., simulation constraints) that may be applied during the digital twin simulation. Examples of consumer requirement rules may include, but are not limited to, a rule/constraint requiring the business service to integrate with cloud object storage service for the storage of consumer data, providing consumers with the ability to choose their own service based on trust (e.g., cloud deployment type), providing the consumer with the ability to choose their choice of service and the provider they trust.

In embodiments, an organization policy may also include service mapping requirement rules. While in some embodiments, a processor may be configured to receive service mapping requirement rules from the entity, in other embodiments, a processor may be configured to receive/collect contextual information. Contextual information may include, but is not limited to information associated with how various business services within the entity may be related. In these embodiments, a processor may be configured to use an AI engine (e.g., configured within cloud service selection system) to analyze the contextual data and determine a service mapping requirement rule.

A service mapping requirement rule may include rules associated with how various business services and/or assets should be organized. In embodiments, a service mapping requirement rule may include constraints that may be considered during simulation associated with how the business services and/or assets of the entity may be organized within the cloud service. In embodiments, an organization policy may include an asset classification rule. An asset classification rule may include constraints associated with classified entity data as it relates to security needs and types of business functionalities and/or services within the entity.

In some embodiments, an organization policy may also include simulation criteria. In embodiments, a processor may be configured to receive/collect simulation criteria. Simulation criteria may include any information or data associated with the entity that is not currently represented in the one or more parameters. For example, an entity may be planning to merge their business with another company or may be expanding into different markets that are unlike the markets they have previously participated in. Simulation criteria represents the information/data associated with the entity's plans for the future and aim to ensure the cloud service selected is not only appropriate for the current business model, but also the upcoming and/or future business model of the entity. In embodiments, simulation criteria may include, but is not limited to, business expansion plan, diversion plan, application specific information (e.g., applications that are generating data), or any other business plan that may be affected by the implementation of a cloud service.

In embodiments, a processor may generate a digital twin of the entity and simulate how the entity is effected when cloud services offered by a particular provider is applied to their entity. In such embodiments, a simulation may determine one or more predicted conditions associated with how the entity may be impacted by particular cloud services offered by providers. While in some embodiments, a processor simulates only one provider and their associated cloud service offerings, in other embodiments, a processor may generate multiple digital twin simulations simultaneously depicting the entity in the various cloud computing environments offered by the providers.

In embodiments, a processor may simulate a digital twin of the entity. A processor may generate the digital twin simulation of the entity using one or more parameters as contemplated herein to determine the one or more predicted conditions. In some embodiments, the processor may receive input from the entity regarding what parameters should be implemented in the digital twin (e.g., organization policy). In embodiments, a processor may apply a cloud service dataset (e.g., associated with the particular provider) to the digital twin of the entity. In these embodiments, a processor may simulate the digital twin with the one or more cloud service offerings (e.g., configured in the cloud service dataset) of a particular provider to analyze and predict how the cloud computing needs of the entity may be addressed by the particular provider.

In these embodiments, a processor may generate one or more digital twin simulations (e.g., having one or more predicted conditions), including but not limited to, simulations regarding how the digital twin of the entity may transition from their current computing environment to the cloud services offered by the particular provider, simulations regarding different cloud services or combinations of cloud services, offered by the particular provider, that can be used to address the needs of the entity (e.g., organization policy and/or simulation criteria), simulations regarding how the various cloud services, offered by the particular provider, may operate/perform over a period of time, and simulations regarding how the cloud services address future goals of the entity. (e.g., growth of the business, planned business merger, etc.).

In some embodiments, a processor may generate one or more digital twin simulations associated with validating steps that may be specific to various cloud design patterns. For example, a processor may generate a digital twin simulation with integration option (e.g., Secure Gateway®, APIs), availability and monitoring, security and privacy, or any combination thereof. In some embodiments, a processor may simulate one or more combinations of cloud services offered by more than one provider. For example, in one example embodiment, a first provider could offer particular cloud service X which may address the majority of the entity's needs. In these embodiments, a processor may generate a digital twin simulation that determines if any other cloud services, offered by other providers, may be combined and/or implemented within the cloud service offered by provider X. Such embodiments may enable an entity to select all the cloud services that may be required to address the cloud computing needs, regardless of what provider offers the service.

In embodiments, a processor may generate a selection report based on the digital twin simulation and may include one or more predicted conditions (e.g., simulation results). In embodiments, a selection report may include the results associated with the digital twin simulation and one or more different providers. In embodiments, a processor may configure a selection report to include as much or as little information as the entity may require. In one example embodiment, based on the entity's preference, a processor may generate a selection report that may simply indicate which of the simulated providers that offers the cloud services that best address the entity's needs. In embodiments, the a processor may generate a selection report including, but not limited to, one or more of the following: (i) the provider that best meets the needs of the entity; (ii) the cloud service or combination of cloud services offered by the provider that best address the needs of the entity; (iii) the mode of cloud deployment appropriate for the entity (e.g., private cloud, public cloud, hybrid cloud, multi-cloud, or community cloud); (iv) how a provider's cloud service offerings provides cloud storage (e.g., cloud storage configurations) for the classified entity data and assets of the entity; (v) how the cloud storage performs over a period of time; (vi) the cost of the cloud services; (vii) a breakdown of metrics associated with each provider such as, robustness, pricing/subscription, availability, support, integration, security, and/or network capabilities; (viii) recommendations of how the entity's current computing design may be replaced or integrated into the identified cloud services; and (ix) how more than one provider's offered cloud services may be combined to address the entity's current needs.

In some embodiments, a processor may generate a digital twin simulation to identify how classified entity data and assets may be stored in the cloud storage (e.g., cloud services) offered by a particular provider. In these embodiments, a processor may simulate what configuration of cloud server may be appropriate for the classified entity data (e.g., multi-cloud, private cloud, hybrid cloud, etc.). In these embodiments, based on the digital twin simulation, a processor may generate a selection report that identifies datasets and assets from the classified entity data that may be moved to one or more appropriate cloud server types. In embodiments, a processor may configure the information distilled from the aforementioned digital twin simulation (e.g., simulated cloud storage configuration) and auto-deploy the classified entity data and/or assets to the appropriate cloud service (e.g., actual cloud storage configuration). In some embodiments, a processor may also generate (e.g., build/place) the classified entity data into the required configuration that may be needed for cloud integration.

In some embodiments, a selection report may include some or all of the aforementioned information as well as a ranking based on what providers offer cloud services that address the entity needs. In these embodiments, an entity may choose a ranking criterion associated with how the different providers are ranked. For example, while in some embodiments, such ranking may be based on what providers offer cloud services that best address the needs of the business, other embodiments may base the ranking on the cost of the offered service.

In embodiments, a processor may collect information/data obtained during the digital twin simulation (e.g., information/data associated with one or more parameters and cloud service datasets) and store this information/data in a historical repository. In some embodiments, a processor may use machine learning (e.g., AI engine) to analyze the information/data. In such embodiments, a processor may determine, based on this historical information, on or more additional components that may be implemented in current or future digital twin simulations. For example, a processor may be able to identify one or more asset classification rules, (e.g., identifying different rules based off of cloud deployment type), service mapping requirement rules, and/or consumer requirement rules. In some embodiments, a processor may generate a knowledge corpus associated with the data and asset classification (e.g., classified entity data) using this historical information/data. In embodiments, this historical information/data may be used to enhance additional or future digital twin simulations and improve the provider selection process.

Referring now to FIG. 1, a block diagram of a cloud service selection system 100, is depicted in accordance with embodiments of the present disclosure, for selecting a provider for an entity. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, cloud selection system 100 may be configured to include parameters 102, cloud service dataset 104, digital twin module 106, and selection report 108. In embodiments, cloud selection system 100 may be configured to collect/receive parameters 102. In these embodiments, parameters 102 may include any data associated with the entity that may be necessary to generate a digital twin simulation (e.g., via digital twin module 106. This data may include, but is not limited to, different types of business data, the number and/or types of business assets, business dimensions, consumer requirement rules, service mapping requirement rules, asset classification rules, and simulation criteria. In embodiments, some or all of this data may be included in an organization policy 110.

In embodiments, cloud service selection system 100 may be configured to collect/receive cloud service dataset 104. In these embodiments, cloud service dataset 104 may include any information associated with cloud services offered by one or more providers(s) 112 that may be used to perform the various simulations (e.g., digital twin module 106), as contemplated herein.

In embodiments, cloud service selection system 100 may be configured to include a digital twin module 106 to perform one or more simulations. In these embodiments, digital twin module 106 may receive parameters 102 (e.g., organization policy 110) and cloud service dataset 104. In embodiments, digital twin module 106 may include AI engine 114 and digital twin simulation engine 116. While in some embodiments, AI engine 114 and digital twin simulation engine 116 may be configured within digital twin module 106, in other embodiments, AI engine 114 may be configured elsewhere in cloud service selection system 100.

In one example embodiment, AI engine 114 may be configured to analyze the one or more parameters 102 and/or the cloud service dataset 104. In these embodiments, AI engine 114 may determine using AI and machine learning techniques (e.g., using data stored in the historical repository) to determine one or more components associated with the parameters 102 and cloud service datasets 104. For example, in some embodiments, AI engine 114 may be used to configure one or more consumer requirement rules, service mapping requirement rules, and/or asset classification rules within the organization policy 110. In some embodiments, historical classified entity data and historical digital twin simulations (e.g., results from prior simulations) may be analyzed by AI engine 114 to generate one or more asset classification rules and generate a knowledge corpus associated with the classified entity data.

In embodiments, AI engine 114 may be configured within digital twin simulation engine 116. In embodiments, digital twin simulation engine 116 may be configured to generate, in real-time, a digital twin of the entity using parameters 102. In these embodiments, digital twin simulation engine 116 may use cloud service dataset 104 to simulate how one or more cloud services offered by a provider 112 may be applied to the digital twin of the entity. In embodiments, digital twin simulation engine 116 may simulate a plurality of different metrics to identify which configuration of cloud services address the criteria of the entity (e.g., as provided in parameters 102).

While in some embodiments, digital twin simulation engine 116 analyzes only one provider 112, in other embodiments, digital twin simulation engine 116 may analyze any additional number of providers 112. In one example embodiment, digital twin simulation engine 116 may simulate how cloud services offered by different providers 112 may be combined to address the needs of the entity (e.g., as provided in parameters 102). In this example embodiment, digital twin simulation engine 116 may validate that the different cloud services, offered by the different providers, are capable of being integrated for the particular purpose needed by the entity. In another example embodiments, digital twin simulation engine 116 may simulate if the cloud service offered by one provider 112 address more of the entity's needs than the cloud service offered by another provider.

In embodiments, digital twin module 106 may configure a selection report 108. In embodiments, a selection report 108 may include one or more predicted conditions derived from the digital twin simulations of the entity and the cloud services offered by the provider(s) 112. In embodiments, selection report 108 may at least identify what provider, or combination of providers, offers the cloud service that is most appropriate for the entity (e.g., most aptly meets the needs of the business). In embodiments, selection report 108 may be configured to include one or more predicted conditions an entity may find useful when selecting a provider. For example, selection report 108 may include the type of cloud deployment may be most suited to for the business data and/or assets of the entity. In some embodiments, where the cloud services of two different providers are recommended, a selection report 108 may include a rank of some or all of the providers 112 simulated by digital twin module 106. In these embodiments, selection report 108 may rank the providers 112 based on one or more metrics ranked highest to lowest or vice versa. These one or more metrics may include any metrics contemplated herein, such as cost of the cloud services, security level, compliance standards, the transfer/handling of "on premises" software to the cloud infrastructure.

Figure 2:
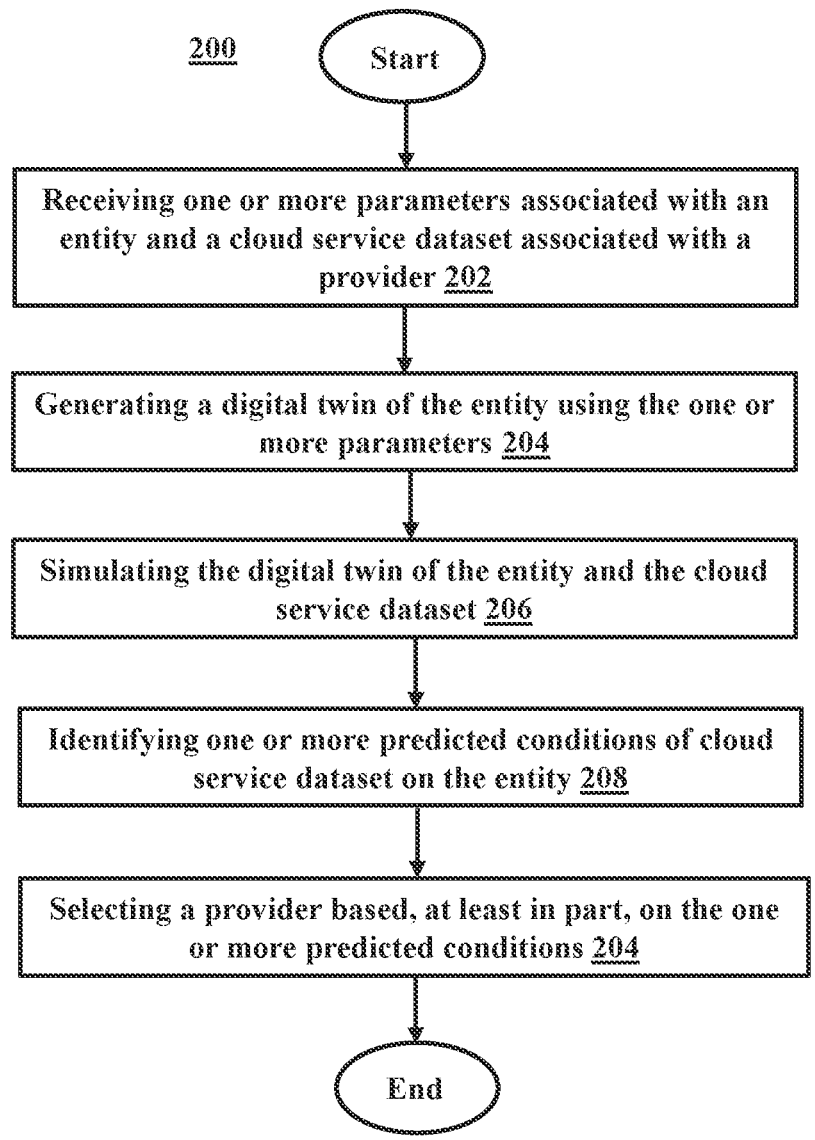
FIG. 2 illustrates a flowchart of a method for selecting a cloud service provider, using digital twin, in accordance with embodiments of the present disclosure.

Referring now to FIG. 2, a flowchart illustrating an example method 200 for selecting a provider, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor receives one or more parameters associated with a business and a cloud service dataset associated with a provider.

In some embodiments, the method 200 proceeds to operation 204. At operation 204, a processor may generate a digital twin of the business using the one or more parameters.

In some embodiments, the method 200 proceeds to operation 206. At operation 206, a processor may simulate the digital twin of the business and the cloud service dataset.

In some embodiments, the method 200 proceeds to operation 208. At operation 208, a processor may identify one or more predicted conditions of cloud service dataset on the business. In these embodiments, the identification of one or more predicted conditions of the cloud service may be responsive to simulating the digital twin of the business and the cloud service dataset.

In some embodiments, the method 200 proceeds to operation 210. At operation 210, a processor may select the provider based, at least in part, on the one or more predicted conditions. In some embodiments, as depicted in FIG. 2, after operation 210, the method 200 may end.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
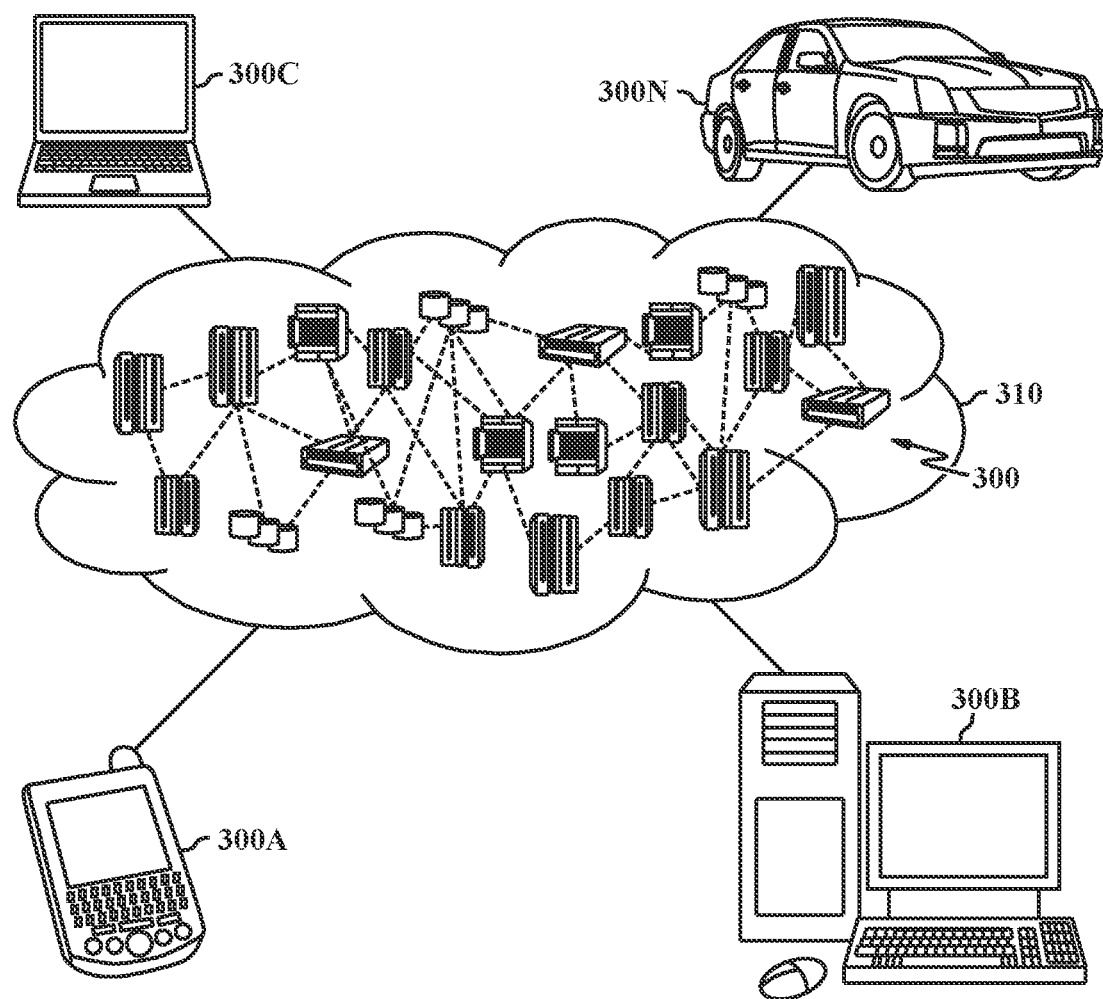
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
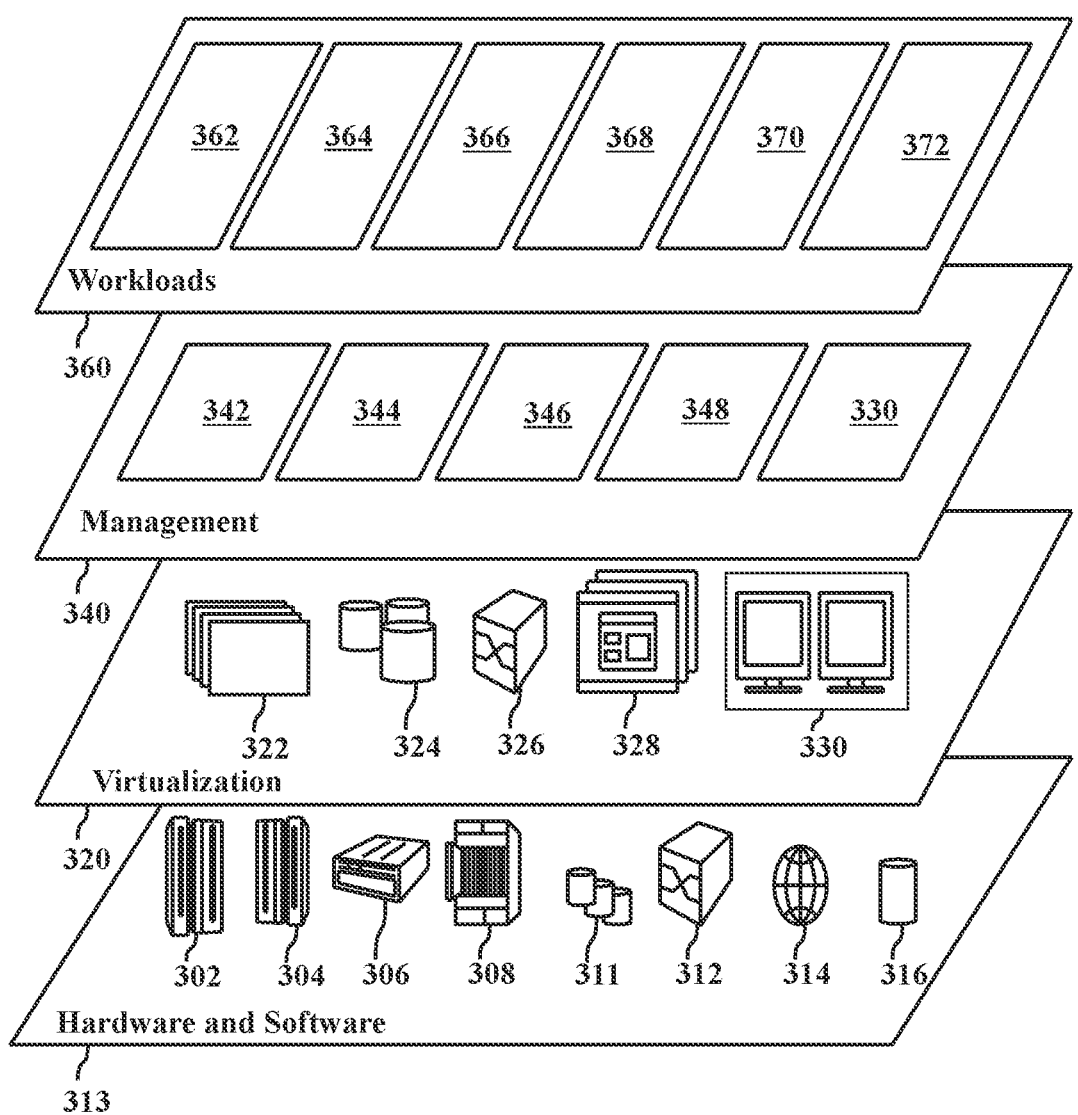
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and proactive cloud service managing 372.

Figure 4:
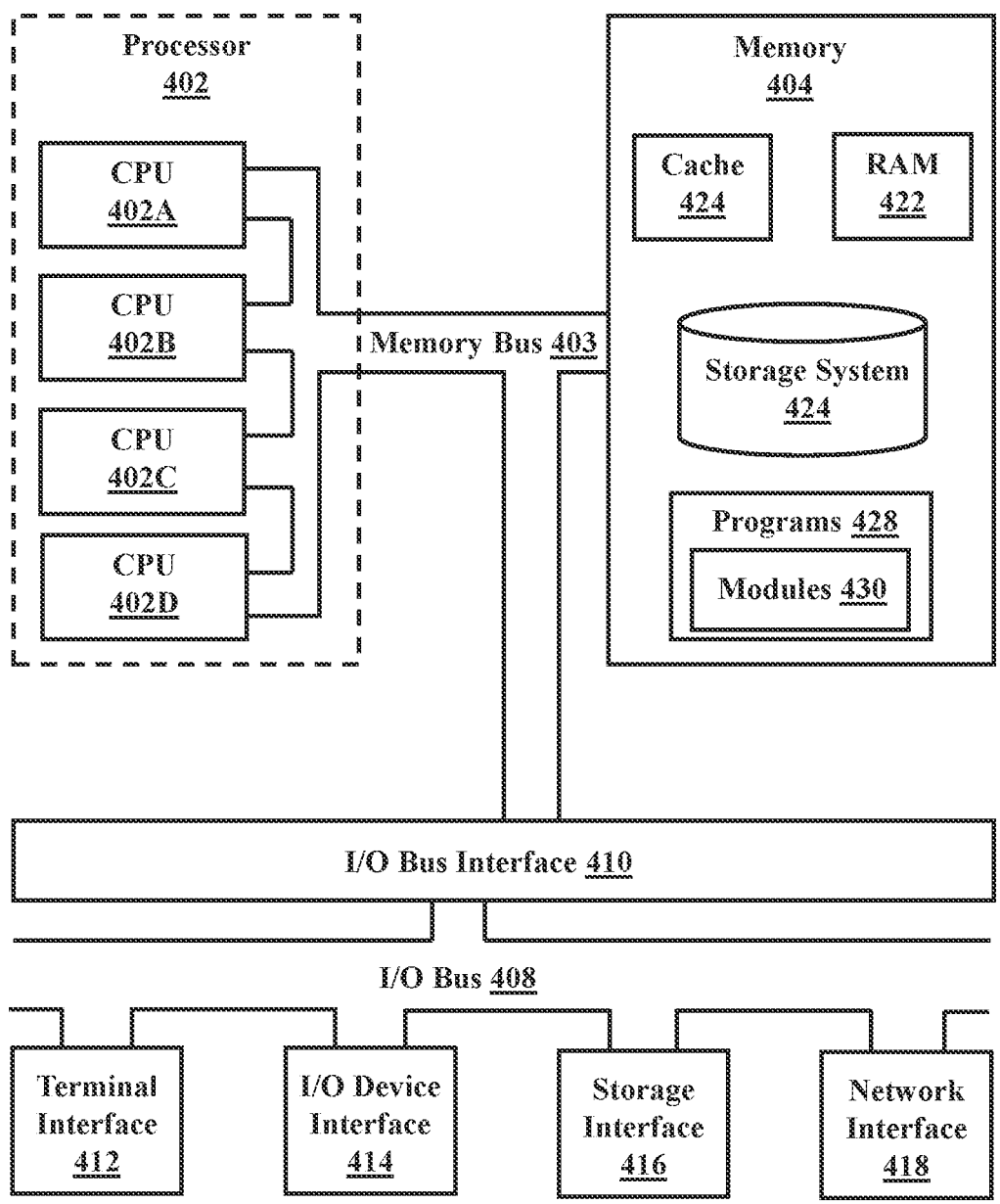
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What claimed is:

1. A method for automatically selecting an optimum provider, the method comprising:
   receiving, one or more parameters associated with an entity and one or more cloud service dataset associated with one or more providers;
   identify one or more consumer requirements rules from the entity;
   generating a digital twin of the entity using the one or more parameters;
   simulating the digital twin of the entity and the one or more cloud service dataset from current computing environment to the cloud services offered by the one or more providers;
   identifying, responsive to simulating the digital twin of the entity and the one or more cloud service dataset, one or more predicted conditions of the one or more cloud service dataset on the entity based on utilizing machine learning to determine the one or more predicted conditions;
   wherein the one or more predicted conditions comprise effects of different cloud services offered by the one or more providers that address the consumer requirements rules; and
   selecting the optimum provider from the one or more providers automatically based, at least in part, on the one or more predicted conditions derived from a generated selection report associated with the digital twin simulation.

2. The method of claim 1, wherein the one or more parameters further comprises an organization policy.

3. The method of claim 1, wherein simulating the digital twin of the entity and the cloud service dataset comprises:
   identifying a plurality of data associated with the entity from the one or more parameters;
   classifying, using the digital twin of the entity, the plurality of data associated with the entity into one or more classified entity data; and
   simulating the one or more classified entity data in a simulated cloud storage configuration associated with the one or more providers.

4. The method of claim 3, further comprising:
auto-deploying the one or more classified entity data into an actual cloud storage configuration associated with the selected optimum provider.

5. The method of claim 1, further comprising:
configuring an historical repository of the one or more parameters, cloud service dataset, and simulations based on the digital twin.

6. The method of claim 5, wherein configuring the historical repository further comprises: generating a knowledge corpus associated with one or more classified entity data using the historical repository.

7. The method of claim 1, wherein selecting the optimum provider further comprises: identifying a particular cloud deployment type.

8. A system for automatically selecting an optimum provider, the system comprising:
a memory; and
a processor in communication with the memory, the processor being configured to perform operations comprising:
receiving one or more parameters associated with an entity and one or more cloud service dataset associated with one or more providers;
identify one or more consumer requirements rules from the entity;
generating a digital twin of the entity using the one or more parameters;
simulating the digital twin of the entity and the one or more cloud service dataset from current computing environment to the cloud services offered by the one or more providers;
identifying, responsive to simulating the digital twin of the entity and the one or more cloud service dataset, one or more predicted conditions of the one or more cloud service dataset on the entity based on utilizing machine learning to determine the one or more predicted conditions;
wherein the one or more predicted conditions comprise effects of different cloud services offered by the one or more providers that address the consumer requirements rules; and
selecting the optimum provider from the one or more providers automatically based, at least in part, on the one or more predicted conditions derived from a generated selection report associated with the digital twin simulation.

9. The system of claim 8, wherein the one or more parameters further comprises an organization policy.

10. The system of claim 8, wherein simulating the digital twin of the entity and the cloud service dataset comprises:
identifying a plurality of data associated with the entity from the one or more parameters;
classifying, using the digital twin of the entity, the plurality of data associated with the entity into one or more classified entity data; and
simulating the one or more classified entity data in a simulated cloud storage configuration associated with the the one or more providers.

11. The system of claim 10, further comprising:
auto-deploying the one or more classified entity data into an actual cloud storage configuration associated with the selected optimum provider.

12. The system of claim 8, wherein the operations further comprise:
configuring an historical repository of the one or more parameters, cloud service dataset, and simulations based on the digital twin.

13. The system of claim 12, wherein configuring the historical repository further comprises: generating a knowledge corpus associated with one or more classified entity data using the historical repository.

14. The system of claim 8, wherein selecting optimum the provider further comprises: identifying a particular cloud deployment type.

15. A computer program product for automatically selecting an optimum provider, the computer program product comprising a computer readable storage medium having program instructions embodied therewith, the program instructions executable by a processor to cause the processors to perform a function, the function comprising:
receiving one or more parameters associated with an entity and one or more cloud service dataset associated with one or more providers;
identify one or more consumer requirements rules from the entity;
generating a digital twin of the entity using the one or more parameters;
simulating the digital twin of the entity and the one or more cloud service dataset from current computing environment to the cloud services offered by the one or more providers;
identifying, responsive to simulating the digital twin of the entity and the one or more cloud service dataset, one or more predicted conditions of the one or more cloud service dataset on the entity based on utilizing machine learning to determine the one or more predicted conditions;
wherein the one or more predicted conditions comprise effects of different cloud services offered by the one or more providers that address the consumer requirements rules; and
selecting the optimum provider from the one or more providers automatically based, at least in part, on the one or more predicted conditions derived from a generated selection report associated with the digital twin simulation.

16. The computer program product of claim 15, wherein the one or more parameters further comprises an organization policy.

17. The computer program product of claim 15, wherein simulating the digital twin of the entity and the cloud service dataset comprises:
identifying a plurality of data associated with the entity from the one or more parameters;
classifying, using the digital twin of the entity, the plurality of data associated with the entity into one or more classified entity data; and
simulating the one or more classified entity data in a simulated cloud storage configuration associated with the one or more providers.

18. The computer program product of claim 17, further comprising:
auto-deploying the one or more classified entity data into an actual cloud storage configuration associated with the selected optimum provider.

19. The computer program product of claim 15, wherein the instructions further comprise:
configuring an historical repository of the one or more parameters, cloud service dataset, and simulations based on the digital twin.

20. The computer program product of claim 19, wherein configuring the historical repository further comprises:
generating a knowledge corpus associated with one or more classified entity data using the historical repository.

* * * * *